(No Model.) 2 Sheets—Sheet 1.

H. M. HOLLAND.
GAME APPARATUS.

No. 563,767. Patented July 14, 1896.

WITNESSES:
P. H. Nagle.
L. Douville.

INVENTOR
Howard M. Holland.
BY John A. Wiedersheim
ATTORNEY.

(No Model.) 2 Sheets—Sheet 2.

H. M. HOLLAND.
GAME APPARATUS.

No. 563,767. Patented July 14, 1896.

WITNESSES:
P. H. Nagle
L. Douville.

INVENTOR
Howard M. Holland
BY John A. Wiedersheim
ATTORNEY.

UNITED STATES PATENT OFFICE.

HOWARD M. HOLLAND, OF HAMMONTON, NEW JERSEY.

GAME APPARATUS.

SPECIFICATION forming part of Letters Patent No. 563,767, dated July 14, 1896.

Application filed January 23, 1896. Serial No. 576,526. (No model.)

*To all whom it may concern:*

Be it known that I, HOWARD M. HOLLAND, a citizen of the United States, residing at Hammonton, in the county of Atlantic, State of New Jersey, have invented a new and useful Improvement in Game Apparatus, which improvement is fully set forth in the following specification and accompanying drawings.

My invention has relation to a graphical representation of a game of foot-ball; and it consists of a novel construction of board designed to simulate a "gridiron" or foot-ball field, and having marked thereon divisions indicating the number of yards on either side the center, each yard being designated by a hole in which a suitable pin or stem carrying a device simulating a foot-ball is adapted to be placed.

It further consists of a novel construction of dial or indicating device, which is provided with a suitable number of circles subdivided in proper divisions, having indicated thereon the characters illustrative of the extent of play at different stages of the game, the play directed by the indicator card or chart being made upon the board by the respective sides alternately.

It further consists of novel details of construction, all as will be hereinafter set forth.

Figure 1:
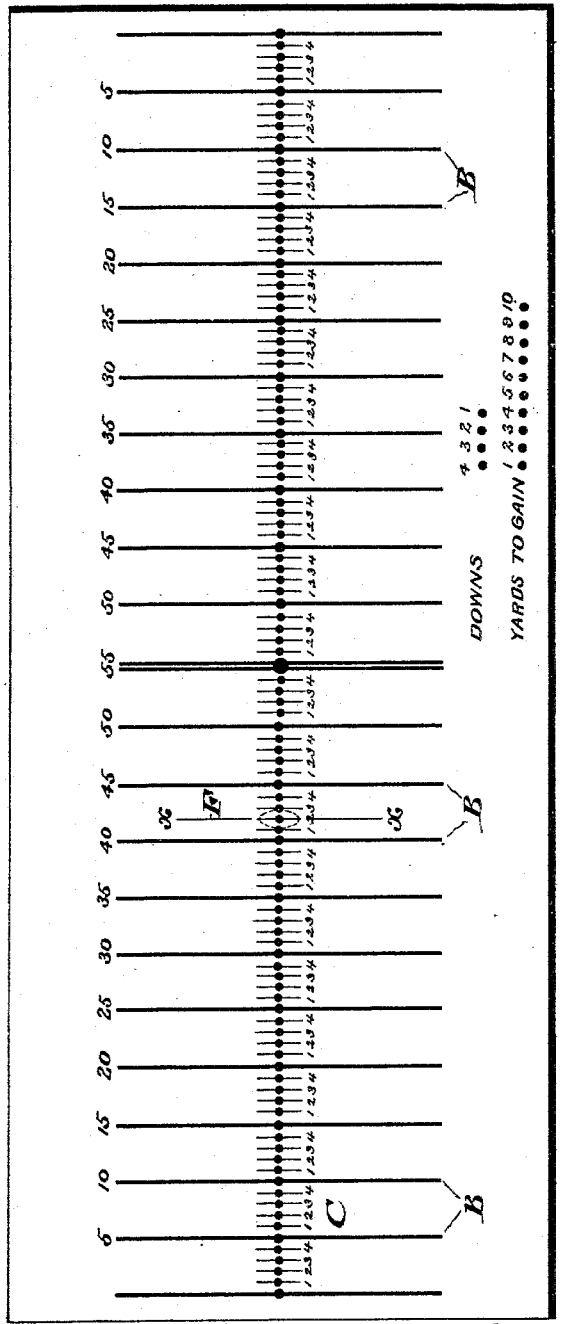
Figure 2:
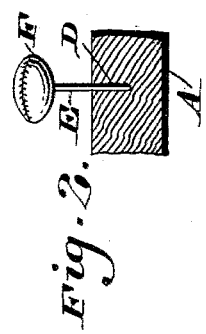
Figure 3:
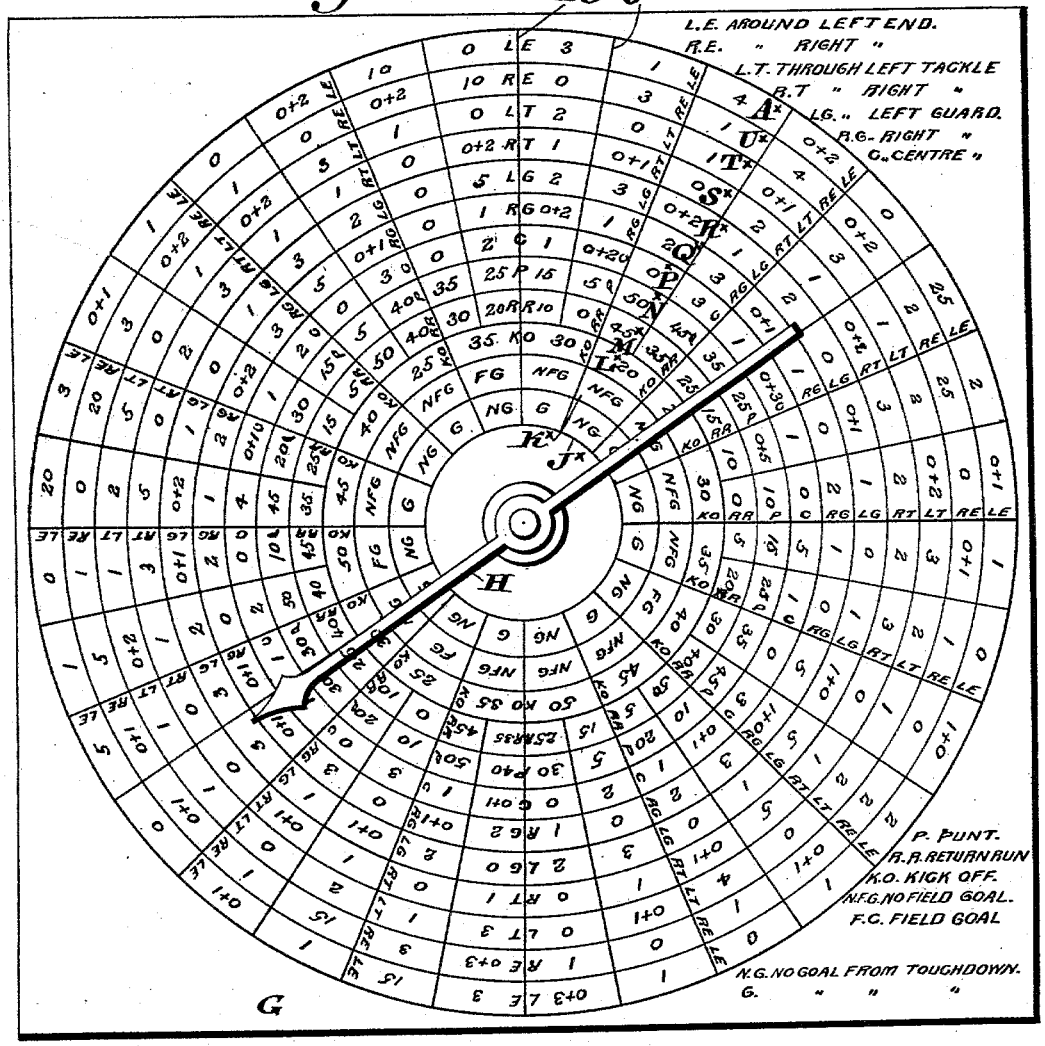
Figure 4:
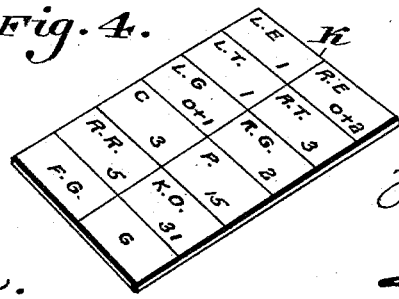

Figure 1 represents a plan view of a device simulating a gridiron or foot-ball field embodying my invention. Fig. 2 represents a section on line $x\,x$, Fig. 1, showing means for supporting the device simulating a foot-ball in position. Fig. 3 represents a dial or chart which is subdivided into suitable divisions, and has an index-finger thereon, as will be hereinafter explained. Fig. 4 represents a perspective view of one of a set of playing-cards, which may be employed in lieu of the dial or chart shown in Fig. 3, if desired.

Similar letters of reference indicate corresponding parts in the several figures.

Referring to the drawings, A designates a board simulating a gridiron, the same being subdivided in either direction from the central point thereof by the indices B into spaces of five yards, while the space C intermediate of said indices is further subdivided into spaces of one yard, each yard being designated by a hole D, into which the pin or stem E is adapted to be inserted, said stem having thereon the device F simulating a foot-ball. The board A has also thereon pin holes or other devices for indicating the number of downs and yards to gain, as indicated near the lower margin of Fig. 1.

In Fig. 3 is shown the chart or index-card employed, which consists of a suitable board or backing, having pivotally mounted thereupon the index-finger H, which is capable of being freely rotated. The said chart is subdivided by means of a series of concentric circles $J^\times$ to $W^\times$, inclusive, into divisions, which are further subdivided by means of the radii J and K, it being noted that the spaces between each concentric circle and a pair of radii has thereon a figure designating the number of yards to gain at the different stages of the game. In the present instance every other of the radii have indicated adjacent thereto symbols LE, RE, LT, RT, LG, RG, C, D, RR, and KO, the same designating, respectively, "around left end," "around right end," "through left tackle," "through right tackle," "through left guard," "through right guard," "through the center," "punt," "return run," and "kick-off," while the spaces between the two inner concentric circles and their radii is designated, respectively, as NGF, FG, NG, G, the same indicating "no field goal," "field-goal," "no goal from touchdown," and "goal from touch-down." The above characters and their significance are clearly illustrated upon the chart seen in Fig. 3 at the right of the same.

In Fig. 4 is shown a perspective view of one of a pack of cards, which may be shuffled or cut after the manner of ordinary playing-cards, said cards having designated thereon the characters indicating the play to be made, while the numerals in the spaces taken in conjunction with said characters or letters indicate the number of yards which are gained by the respective plays, as will be explained.

The operation is as follows: The device simulating a foot-ball F is placed in the center of the board, and the index-finger H is caused to rotate, the player announcing previously the play which he intends to make—for instance, first he "kicks off" the index-finger stopping at the point indicated in Fig. 3, indicates that thirty yards have been gained on the kick, whereupon the pin E is moved thirty yards or thirty holes from the center position to the right or left, according to whichever side said player has elected. The opposing player now spins the index for a return run, and if we assume the finger to stop at the point indicated in Fig. 3 it will be seen that twenty-five yards has been gained by said return run, whereupon the opposing player moves the pin E, carrying the device simulating a foot-ball twenty-five holes toward the starting-point for first down. Now the player will announce his play—for instance, he says before spinning the index, "I will send the ball through the left guard," the index-finger stopping at the point indicated in Fig. 3, indicates three yards have been gained through left guard, whereupon the pin E is moved three holes ahead for second down. Each side has to make five yards on four downs, or the ball goes to the opposing side, and thus the game is continued.

If a set of cards are employed, as shown in Fig. 4, upon shuffling and cutting the same, the play having been previously announced, the characters designating the same, as will be found thereupon as already described, after which the player having so shuffled and cut, makes the move called for.

It will thus be seen that the foregoing is a very compact and readily-understood system for graphically playing the game of foot-ball, it being permitted for each player to announce whatever play he desires to make prior to making the same, while the advance or retrogression of the ball caused by said play is directed upon the chart (seen in Fig. 3) and afterwards graphically indicated upon the "gridiron" (seen in Fig. 1).

If desired, the following symbols can be employed to indicate the status of the game at different stages, it being understood that said symbols are indicated upon the dial at different points: O+ Loss. * Off side play. — Foul tackle. × × Holding.

Having thus described my invention, what I claim as new, and desire to secure by Letters Patent, is—

1. A game apparatus for the purpose set forth, consisting of the board A having divisions and subdivisions thereon indicative of a foot-ball "gridiron" with holes therein at each line of the subdivisions, a pin adapted to be inserted in either of said holes, said pin having thereon the device F simulating a foot-ball, and the board G having a series of concentric circles, and radial lines thereon from the inner circle outwardly, and intermediate radial lines from another inner circle to the outer circle, the inner spaces formed by said circles having marks indicative of goal play, and every alternate radii having marks indicative of different plays in the game, while the other spaces have numerals indicative of yards gained in the play, said board having the index-finger H, said parts being combined substantially as described.

2. In a game apparatus, the board G with index-finger H, and having concentric circles with radial lines forming spaces, marks in said spaces indicative of distances gained in the play, and of goal play, and on alternate radial lines characters indicative of plays made in the game, in combination with a board having the representation of a "gridiron" thereon, substantially as described.

3. In a game apparatus for the purpose set forth, a board having a series of concentric circles and radii thereon, symbols adjacent every other one of said radii indicative of a play in said game, symbols in the spaces formed by the three inner concentric circles indicative of the goals in the game, and a rotating index on said board to determine the play made, said parts being combined substantially as described.

HOWARD M. HOLLAND.

Witnesses:
G. W. PRESSEY,
S. R. HOLLAND.